(12) United States Patent
Smith et al.

(10) Patent No.: US 6,918,612 B2
(45) Date of Patent: Jul. 19, 2005

(54) ELECTRONIC SEAT OCCUPANT CLASSIFICATION SYSTEM

(75) Inventors: Francis N. Smith, Clarkston, MI (US); Joshua Forwerck, Royal Oak, MI (US); Bradford Gauker, Clinton Township, MI (US)

(73) Assignee: Autoliv ASP, Inc., Ogden, UT (US)

( * ) Notice: Subject to any disclaimer, the term of this patent is extended or adjusted under 35 U.S.C. 154(b) by 120 days.

(21) Appl. No.: 10/384,282

(22) Filed: Mar. 7, 2003

(65) Prior Publication Data

US 2004/0174004 A1 Sep. 9, 2004

(51) Int. Cl.$^7$ ............................................. B60R 21/32
(52) U.S. Cl. ................... 280/735; 180/273; 200/85 A; 340/667
(58) Field of Search .................. 280/735; 180/273; 340/667, 438, 436; 200/85 A; 701/45

(56) References Cited

U.S. PATENT DOCUMENTS

| | | | |
|---|---|---|---|
| 5,232,243 A | 8/1993 | Blackburn et al. | |
| 5,474,327 A | 12/1995 | Schousek | |
| 5,612,876 A | 3/1997 | Zeidler et al. | |
| 5,732,375 A | * 3/1998 | Cashler | 280/735 |
| 5,986,221 A | * 11/1999 | Stanley | 280/735 |
| 6,012,007 A | 1/2000 | Fortune et al. | |
| 6,015,163 A | 1/2000 | Langford et al. | |
| 6,070,115 A | 5/2000 | Oestreicher et al. | |
| 6,108,842 A | 8/2000 | Severinski et al. | |
| 6,109,117 A | 8/2000 | Stanley et al. | |
| 6,186,538 B1 | 2/2001 | Hamada et al. | |
| 6,201,480 B1 | 3/2001 | Aoki | |
| 6,223,606 B1 | 5/2001 | Burke et al. | |
| 6,242,820 B1 | 6/2001 | Shankar et al. | |
| 6,243,634 B1 | 6/2001 | Oestreicher et al. | |
| 6,250,671 B1 | 6/2001 | Osmer et al. | |
| 6,253,133 B1 | 6/2001 | Sakai et al. | |
| 6,255,790 B1 | 7/2001 | Popp et al. | |
| 6,259,167 B1 | 7/2001 | Norton | |
| 6,329,914 B1 | 12/2001 | Shieh et al. | |
| 6,345,839 B1 | 2/2002 | Kuboki et al. | |
| 6,348,663 B1 | 2/2002 | Schoos et al. | |
| 6,356,194 B1 | 3/2002 | Fukui et al. | |
| 6,366,200 B1 | 4/2002 | Aoki | |
| 6,367,837 B1 | 4/2002 | Hamada et al. | |
| 6,378,899 B1 | 4/2002 | Fujimoto | |
| 6,567,732 B2 | * 5/2003 | Drobny et al. | 280/735 |
| 6,735,508 B2 | * 5/2004 | Winkler | 280/735 |
| 2003/0150283 A1 | * 8/2003 | Stanley et al. | 73/862.391 |

FOREIGN PATENT DOCUMENTS

| | | | | |
|---|---|---|---|---|
| JP | 09240424 A | * 9/1997 | ............ | B60R/21/32 |
| JP | 11310071 A | * 11/1999 | ............ | A47C/7/02 |
| WO | WO 00/51853 | 9/2000 | | |

* cited by examiner

Primary Examiner—Peter C. English
(74) Attorney, Agent, or Firm—Sally J. Brown

(57) ABSTRACT

An occupant classification system for recognizing the type of occupant of a motor vehicle seat especially for use in controlling an inflatable restraint system. The classification system utilizes a number of on-off electrical switches arranged in a pattern on a seat cushion mat. Signals from the switches may be processed in a variety of manners to characterize the occupant.

13 Claims, 3 Drawing Sheets

ELECTRONIC SEAT OCCUPANT CLASSIFICATION SYSTEM

FIELD OF THE INVENTION

This invention relates to a system for classifying occupants of a motor vehicle, specifically for purposes related to its inflatable restraint system.

BACKGROUND OF THE INVENTION

Air cushion restraint systems or inflatable restraints have been in use for several decades in automobiles. These systems have demonstrated their effectiveness in reducing occupant injuries in the event of vehicle impacts. Inflatable restraints are typically used to provide frontal impact protection, and variants are used for protection in side impact conditions. These systems generally incorporate a gas generator, referred to as an inflator, coupled with a flexible fabric bag which is stored in a folded condition and is inflated by the gasses generated by the inflator upon receiving a deployment signal. These devices are stored behind interior compartment panels and are normally hidden from view. Various types of impact sensors are located at strategic locations around the vehicle to detect the deceleration forces associated with a vehicle impact. A restraint system controller receives crash sensor inputs, evaluates them, and sends an appropriate deployment signal to initiate the deployment sequence when the sensors detect a particular crash-type and severity level.

Designers of inflatable restraint systems have made significant advancements in the design and manufacture of such systems. One area of development has been in the design of multiple level inflator systems. These systems incorporate an inflator capable of modulating the volume of produced gas and the deployment timing sequence as needed for a particular category of occupant or type of impact. In order for such systems to properly adapt to the occupant, some type of sensing system is needed to classify the occupant within certain ranges of seating height, mass, etc.

Frontal impact inflatable restraint systems are designed for seated occupants within a given seated height and mass range. Presently available inflatable restraint systems are not intended to provide impact protection for belted child restraints, or for various small sized children occupants. For these particular types of occupants, it is preferred to disable the inflatable restraint system entirely for that designated seating position.

Disabling an inflatable restraint for a given designated seating position may be accomplished through a manual driver input as is currently done with certain presently available vehicles. This approach is primarily provided for two-passenger vehicles where it may be necessary for a driver to place a child restraint seat in the front passenger seat of the vehicle. In such cases, the driver has a keyed switch to disable the inflatable restraint system for that designated seating position. Although such a manual inflatable restraint override switch is effective when used properly, there are concerns both by automotive manufacturers and governmental regulatory authorities that such an approach is cumbersome and unreliable. Improperly used, such systems can result in inappropriate deployment in some instances, and deactivation in conditions where the system could provide impact protection for the seated occupant.

In order to overcome the disadvantages of a manually operated inflatable restraint override switch, manufacturers have investigated and developed a number of technical solutions which automatically evaluate an occupant sitting in a vehicle. Examples of such automated systems include ultrasonic ranging systems which evaluate a sonic return signal as a means of classifying an occupant. Another general category of such occupant classification systems include the use of seat carried sensors. The seats are instrumented with a number of sensors which are activated to produce signals which are interpreted by the inflatable restraint system controller. Such switches may sense pressure, force, displacement, or may be sensitive to an electrical signal parameter such as capacitive coupling. Although such systems have proved effective, there is a continuing need to improve their reliability, ease of assembly, and enable the outputs of the seat sensors to be processed rapidly.

SUMMARY OF THE INVENTION

In accordance with the present invention, an occupant classification system is provided based upon the use of an array of on/off type pressure switches arranged in the seat cushion. These switches are placed in strategic locations or zones. Through the use of the data analysis techniques in accordance with this invention, occupant classification can be conducted rapidly and reliably. This invention is further related to the design of a seat on/off pressure switch usable in connection with this invention.

Additional benefits and advantages of the present invention will become apparent to those skilled in the art to which the present invention relates from the subsequent description of the preferred embodiment and the appended claims, taken in conjunction with the accompanying drawings.

DETAILED DESCRIPTION OF THE INVENTION

Figure 1:
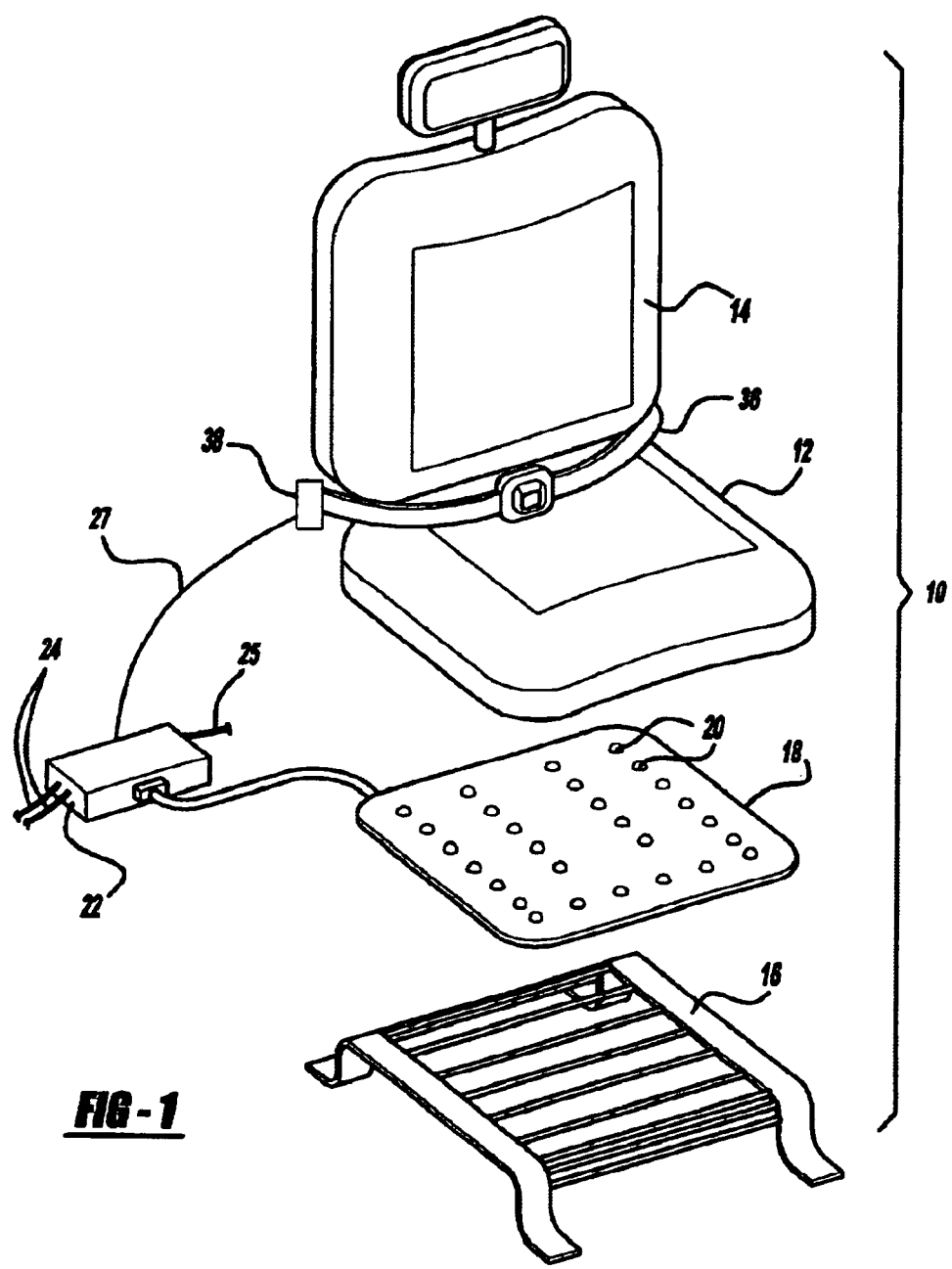
FIG. 1 provides an exploded pictorial view of a seat assembly in accordance with the present invention.

A seat assembly incorporating the features of this invention is illustrated in an exploded manner in FIG. 1 and is generally designated there by reference number 10. Seat assembly 10 principally comprises seat cushion 12 and seat back 14 which provide the primary seating surfaces for the occupant. Underlying seat cushion 12 and providing structural support for the seat assembly 10, is seat suspension assembly 16. A number of individual on/off switches 20 are arranged in a desired pattern and carried by switch array mat 18. As will be explained in further detail later in this description, the outputs of on/off switches 20 from mat 18 may be analyzed in a variety of manners to provide signals concerning the type of occupant occupying the seat assembly 10.

The outputs from the individual on/off switches 20 of mat 18 are processed using microprocessor based controller 22. Controller 22 receives inputs from crash sensors (not shown) on lines 24 and outputs an inflation signal on line 25 based on internal logic signal processing.

As further shown in FIG. 1, a belt restraint system 36 is provided for seat assembly 10. The belt restraint system includes belt tension sensor 38. Sensor 38 is provided to identify seat belt tension loads that are higher than the comfort level of a normally seated adult occupant. Controller 22 receives the outputs from belt tension sensor 38 on line 27 and disables the associated inflatable restraint system when high belt loads are detected which are associated with cinching a child seat in position within seat assembly 10. Since belt loads on a child's seat can cause switches 20 to turn-on in a manner similar to a heavier occupant, the belt tension sensor 38 is required to measure a belt tension load which exceeds some threshold of, for example, twenty or thirty pounds or higher, to indicate to the system that a small occupant with a large belt load on the child's seat is present.

Figure 2:
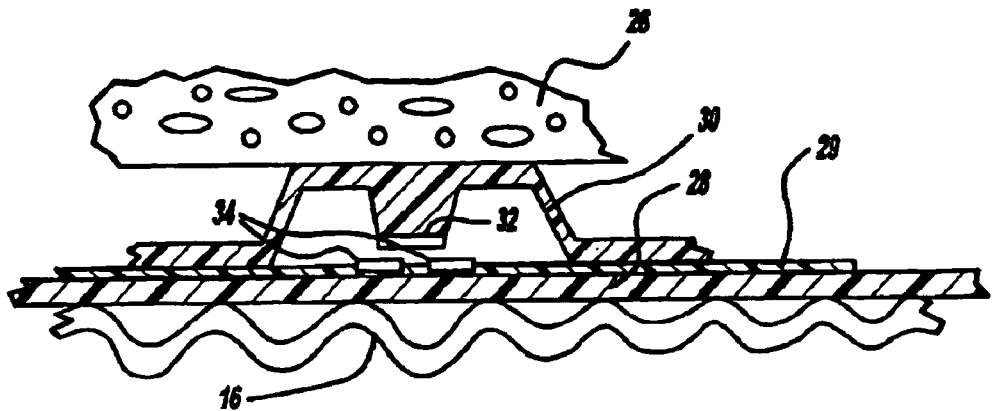
FIG. 2 is a side cross sectional view of one of the seat switches of the seat assembly shown in FIG. 1.

Various designs of on/off switches 20 may be used in connection with this invention. FIG. 2 illustrates in a cross-sectional view the construction of one of the on/off switches 20 of mat 18. Mat 18 comprises a plastic sheet 28 and a switch base sheet 29. As illustrated, the switches 20 are placed between seat foam layer 26 and the flexible plastic sheet 28 which directly contacts seat suspension 16. An elastomeric dome structure 30 supports switch contact 32. When compressed by a sufficient force, dome structure 30 collapses and switch contact 32 falls into physical contact with switch contacts 34 carried by the switch base sheet 29 bridging those contacts to provide a closed electrical circuit. Switches 20 are referred to electrically as single-pole, single-throw, normally-open types.

A preferred material for forming elastomeric dome structure 30 is silicone rubber, which is believed to provide a desired level of performance, ruggedness, and reliability. Plastic sheet 28 over the suspension system 16 provides a stable surface for the activation forces on switches 20. The force necessary to close the contacts for switches 20 would be based upon experimental investigation. In one implementation of the present invention, on/off switches 20 were selected having a turn-on force of 3.86 N (exerted in a direction compressing dome 30 downwardly). Other seat configurations would likely require different turn-on forces necessary to distinguish between occupants such as adult and child occupants.

Other configurations of switches 20 may be used with this invention such as normally closed types in which an electrical circuit is opened when a force exceeding a threshold level acts on the switch. Further, other switch variations could be used for detecting displacement, force, or pressure acting on the seat. Irrespective of switch type, this invention is implemented with switches having two discrete states, as opposed to types such as variable resistors which provide a range of outputs over a continuum.

Switches 20 are located to detect the critical pressure points by a process used for initially selecting the switch locations for a particular motor vehicle and seat application. The intent of the use of this invention is to deactivate inflatable restraint systems when an occupant smaller than a fifth percentile female is seated in seat assembly 10. Other implementation could detect various types of occupants for use with multiple level inflators. In an initial calibration and design process, various occupants and FMVSS 208 anthropoids are placed in seat assembly 10. During that initial design process, a switch array mat having a large number, for example 2,016 individual pressure cells or switches, are located and carried by the array mat. The critical pressure points are identified from the signals generated from the array of switches for different sized occupants, with and without child seats, with and without different seat belt tensile loads, at the various seat back 14 recline angles. Various types of occupants which would include fifth, fiftieth, and ninety-fifth percentile male and female, and various sized child anthropoids along with various child restraint systems, are installed in the seat. Electrical signal patterns are developed by the individual switches, are analyzed for each condition. Based on the particular patterns of activation, a smaller number of on/off switches 20 are strategically located on mat 18. In the example illustrated, array mat 18 features twenty-eight switches 20.

Now with reference to FIGS. 3A, 3B, 4A, and 4B, various occupant discrimination approaches will be described in accordance with this invention. For each of these figures, an activated switch 20 caused by downward seat pressure or force above a predetermined threshold is designated by a filled in black circular region, whereas deactivated switches appear as an open ring.

Figure 3A:
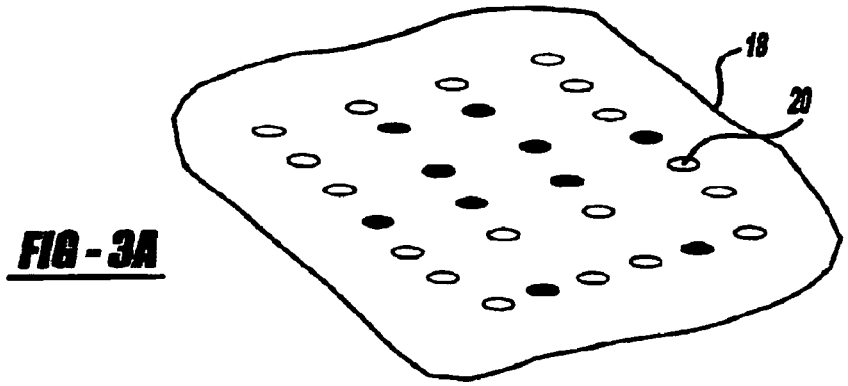
FIGS. 3A and 3B illustrate a particular seat switch activation pattern in accordance with a first methodology for analyzing the outputs of the seat switches of this invention.
Figure 3B:
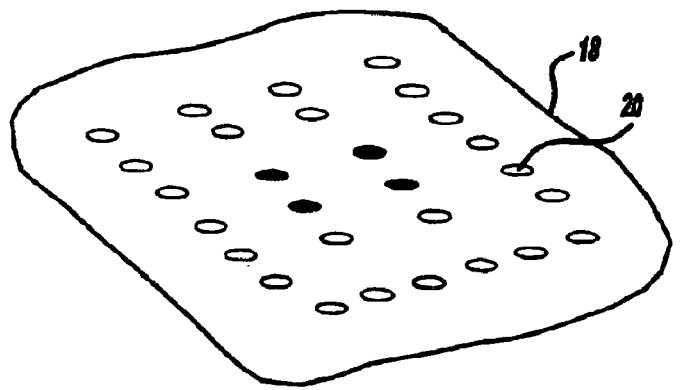

The activation pattern shown in FIG. 3A identifies a particular activation pattern associated with a small adult occupying seat 10. In that instance, the number of total switches activated equals ten. FIG. 3B indicates a child occupying the seat in which four switches 20 are activated. This approach, based on a simple count of the total number of activated switches 20, provides one means of discriminating between two types of occupants. This technique is illustrated by the following table.

$$\text{Signal} = \frac{\text{Figure 3A – Small Adult}}{\text{Total switches activated}} = 10 \quad \text{Signal} = \frac{\text{Figure 3B – Child}}{\text{Total switches activated}} = 4$$

In this example, a signal below a threshold, for example a signal level of 5 would disable the inflatable restraint system whereas a higher signal would enable it to deploy in a crash condition.

Figure 4A:
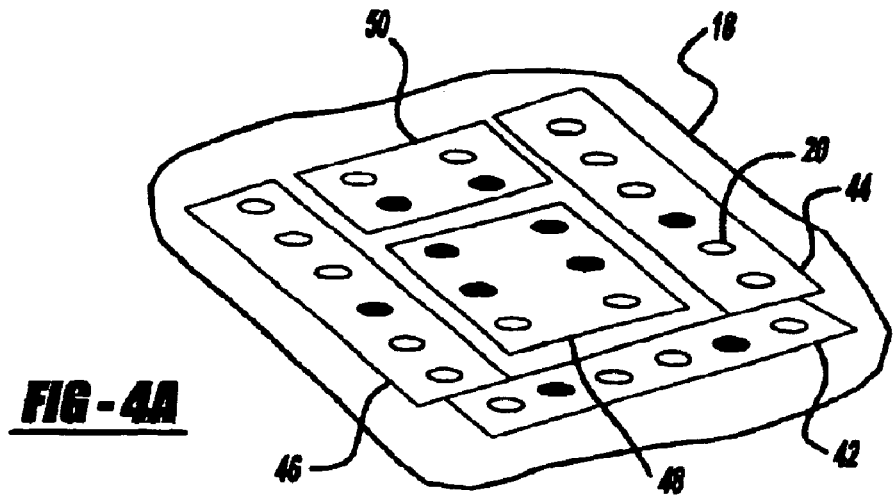
FIGS. 4A and 4B illustrate a seat activation pattern which is designated as within discrete zones of the seat cushion for use in analyzing the outputs of the seat switches in accordance with additional embodiments of this invention.
Figure 4B:
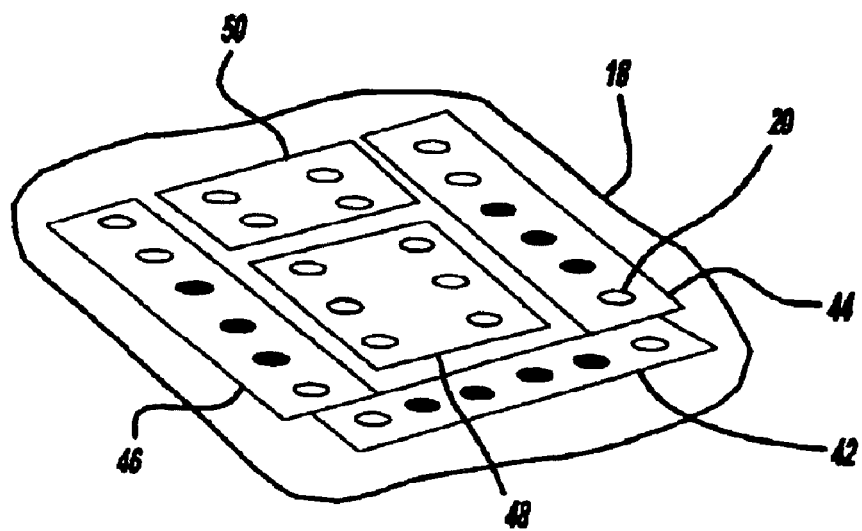

Now with reference to FIGS. 4A and 4B, another approach toward discriminating between occupant types is illustrated. In this instance, groups of switches 20 are arranged into zones, including a front edge zone 42, lateral edge zones 44 and 46, central zone 48, and rear zone 50. FIG. 4A illustrates an activation pattern associated with a small adult occupying the seat 10. Since it is found in a particular implementation that rear zone 50 is highly associated with an adult occupant, a multiplier can be applied to the number of switches 20 activated in that zone. In this example, all other zones 42, 44, 46, and 48 are given equal weight. The following chart represents the differences in signals provided between the small adult pressure conditions illustrated in FIG. 4A, versus the switch activation pattern related to a child in a booster seat as illustrated in FIG. 4B.

| FIG. 4A - Small Adult | FIG. 4B Child in Booster Seat |
|---|---|
| 1 switch in zone 44 × 1 = 1 | 3 switches in zone 44 × 1 = 3 |
| 2 switches in zone 50 × 4 = 8 | 0 switches in zone 50 × 4 = 0 |
| 4 switches in zone 48 × 1 = 4 | 0 switches in zone 48 × 1 = 0 |
| 2 switches in zone 42 × 1 = 2 | 4 switches in zone 42 × 1 = 4 |
| 1 switch in zone 46 × 1 = 1 | 3 switches in zone 46 × 1 = 3 |
| Signal Total = 16 | Signal Total = 10 | in this example, a signal total below a threshold of, for example 12, would disable the inflatable restraint system.

Again with reference to FIGS. 4A and 4B, another approach toward discriminating between occupants is provided. Because adults tend to cover a greater number of zones 42, 44, 46, 48, and 50, another alternative is to identify the number of zones that have switches 20 activated and add them to the total number of switches 20 activated. The following chart represent an analysis of the data provided between FIGS. 4A and 4B using this methodology.

FIG. 4A—Small Adult $$\text{Signal} = 10 \text{ (total switches)} + 5 \text{ (zones covered)} = 15$$

FIG. 4B—Child in Booster Seat $$\text{Signal} = 10 \text{ (total switches)} + 3 \text{ (zones covered)} = 13$$

In this example, a signal total below a threshold of, for example 14, would disable the inflatable restraint system.

Still another alternative involves multiplying the activated switch 20 count by a zone saturation multiplier value. When the signals with the multiplier applied are summed, a threshold is established to ensure that an adult occupant will always register higher values than children occupants. This approach is described by the following example table:

FIG. 4A—Small Adult $$\text{Signal} = \frac{10 \text{ (total switches)} \times 5 \text{ (zones covered)}}{5 \text{ (zones associated with an adult)}} = 10$$

FIG. 4B—Child in Booster Seat $$\text{Signal} = \frac{10 \text{ (total switches)} \times 3 \text{ (zones covered)}}{5 \text{ (zones associated with an adult)}} = 6$$

In this example, a signal total below a threshold value of, for example 8, would disable the inflatable restraint system.

For any of the examples above, if a seat belt tension load above a predetermined level is sensed by the belt tension sensor 38, the associated inflatable restraint system is disabled, irrespective of the activation pattern of switches 20.

While the above description constitutes the preferred embodiment of the present invention, it will be appreciated that the invention is susceptible to modification, variation and change without departing from the proper scope and fair meaning of the accompanying claims.

What is claimed is:

1. An occupant classification system for a motor vehicle having an occupant seat, an inflatable restraint system for providing impact protection for an occupant of the seat, and a belt restraint system associated with the seat, the occupant classification system for classifying an occupant of the seat for purposes of providing a control signal for the inflatable restraint system as a function of certain types of occupants occupying the seat, the occupant classification system comprising:

an array of on-off switches carried by a seat cushion of the seat wherein the seat cushion is divided into two or more discrete zones with at least two of the on-off switches in each of the zones;

a seat belt tension sensor providing an output related to a belt tension acting on the belt restraint system; and a controller for receiving signals from the on-off switches and the seat belt tension sensor and for providing the control signal for the inflatable restraint system, wherein a belt tension signal related to a belt tension above a predetermined level associated with the presence of a child restraint seat in the seat will influence the controller to produce the control signal for disabling the inflatable restraint system and the outputs from the on-off switches will influence the controller based on the number of switches activated in each zone to provide the control signal distinguishing between occupants for controlling the inflatable restraint system.

2. The classification system of claim 1 wherein the control signal for the inflatable restraint system selectively enables or disables the inflatable restraint system.

3. The classification system of claim 1 wherein the on-off switches are single-pole, single-throw switches.

4. The classification system of claim 3 wherein the on-off switches are normally open switches.

5. The classification system of claim 1 wherein the controller provides the control signal for the inflatable restraint system based upon the total number of the on-off switches activated by an occupant.

6. The classification system of claim 1 wherein the control signal is based upon the number of the on-off switches activated in each of the zones, and the control signal for the inflatable restraint system being influenced to a greater degree by the on-off switches in a particular one of the zones as compared with the on-off switches in other zones.

7. The classification system of claim 1 wherein the control signal is based upon the number of the zones having the on-off switches which are activated.

8. The classification system of claim 1 wherein the control signal is based upon the number of the zones having the on-off switches which are activated and the total number of the on-off switches which are activated.

9. The classification system of claim 1 wherein the control signal is based upon the product of the total number of the on-off switches which are activated and the number of zones having the on-off switches which are activated, divided by the number of zones associated with an adult occupant occupying the seat.

10. The classification system of claim 1 wherein the zones include at least a pair of lateral edge zones, a front edge zone, a center zone, and a rear zone.

11. The classification system of claim 10 wherein the on-off switches comprise a first electrical contact carried by a base sheet and an elastomeric dome carrying a second electrical contact, wherein compression of the elastomeric dome causes the first and second electrical contacts to electrically contact one another.

12. The classification system of claim 1 wherein the on-off switches are carried by an array mat.

13. The classification system of claim 1 wherein the on-off switches are positioned between a foam seat cushion layer and a seat suspension.

\* \* \* \* \*